May 28, 1929

G. A. KNAAK

SNAP ACTION MECHANISM

Re. 17,304

Original Filed April 9, 1919

Inventor
George A. Knaak
By Bottum, Bottum, Hudnall & Fisher
Attorneys.

Reissued May 28, 1929. Re. 17,304

UNITED STATES PATENT OFFICE.

GEORGE A. KNAAK, OF MILWAUKEE, WISCONSIN, ASSIGNOR, BY MESNE ASSIGNMENTS, TO PENN ELECTRIC SWITCH CO., OF DES MOINES, IOWA, A CORPORATION OF IOWA.

SNAP-ACTION MECHANISM.

Original No. 1,618,963, dated February 22, 1927, Serial No. 288,849, filed April 9, 1919. Application for reissue filed February 18, 1929. Serial No. 340,936.

This invention relates to snap action mechanisms and the object of the invention is to improve the construction of snap action mechanisms in the manner to be hereinafter described and claimed.

Referring to the drawings which accompany this specification and form a part hereof, which drawings illustrate an embodiment of this invention, and on which drawings the same reference characters are used to designate the same parts wherever they may appear in each of the several views.

Figure 1:
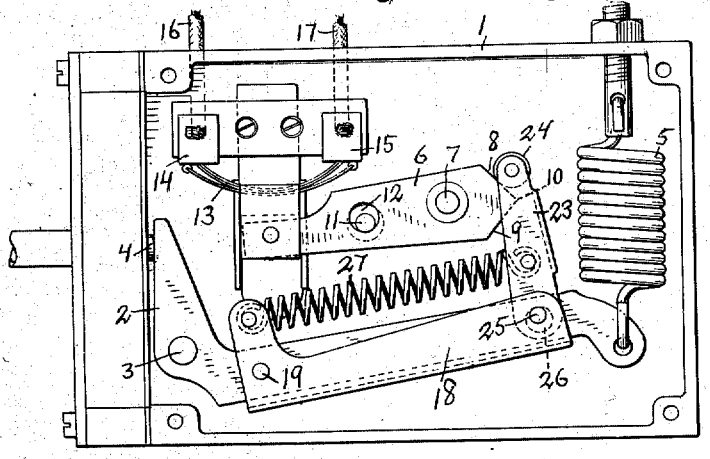
Figure 1 is an elevation of a snap mechanism showing the parts in the relative positions which they occupy in one positive, predetermined position of the actuated member.
Figure 2:
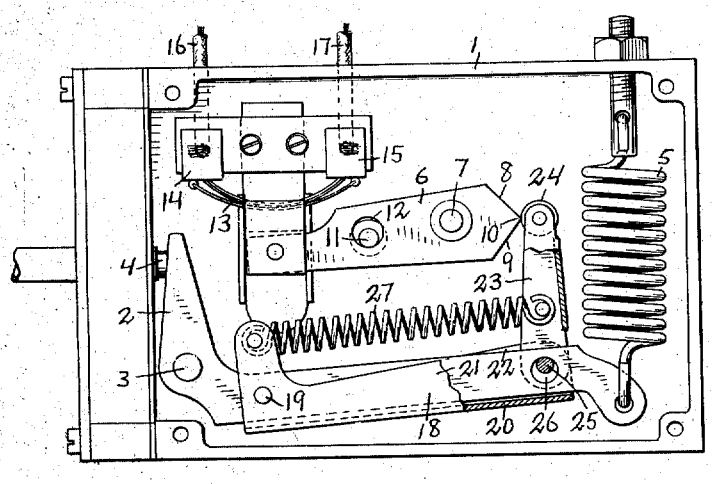
Figure 2 is an elevation of the same mechanism showing the parts in the relative positions which they occupy in an impositive position of the actuated member when the parts are in positions for instantaneous change from one positive, predetermined position to another positive, predetermined position of the actuated member.

In all snap action mechanisms with which I am familiar, prior to my invention, there is a dwell in the operation of the mechanism while parts are moving to change the actuated member from one positive, predetermined position to another positive, predetermined position. This dwell rendered the operation of the mechanism impositive and uncertain and was generally objectionable and in some mechanisms was positively injurious. The object of this invention is to eliminate the dwell or dwell point of such prior mechanisms.

For the sake of simplicity of illustration and description I have illustrated this invention as applied to a form of snap action, electric switch, and shall describe it as applied to such use without, however, intending by such illustration and description to limit my invention to use with an electric switch.

Referring to the drawings, the reference numeral 1 designates a casing within which a bell-crank lever 2 is pivoted upon a pivot 3. A plunger 4 is adapted to swing the bell-crank lever 2 upon its pivot 3 in one direction by overcoming the resistance of a spring 5 and the spring 5 is adapted to swing the bell-crank lever 2 upon its pivot 3 in the opposite direction when the push of the plunger 4 decreases, in a manner which will be readily understood.

It may be assumed that the plunger 4 is responsive to any changeable condition whatever, as for example, the pressure of a fluid or a temperature condition. Movements of sufficient magnitude of the bell-crank lever 2 will move the actuated member 6 from one positive, predetermined position to another positive, predetermined position. The actuated member 6 is pivoted upon a pivot 7 and has oppositely inclined faces 8 and 9 at one end which are shown by the drawings as meeting in a point 10. A pin 11 projects into an aperture 12 in the actuated member 6 and serves as a stop to limit the extent of movement of the actuated member 6 about its pivot 7 in either direction. A spring-bridge switch member 13 is illustrated as connected with the actuated member 6 so as to be pressed against electric contacts 14 and 15 to establish an electric circuit between the wires 16 and 17 when the actuated member 6 is in one positive, predetermined position and so as to be removed from the electric contacts 14 and 15, to break the circuit, when the actuated member 6 is in another positive, predetermined position.

A second bell-crank lever 18 or actuating member is pivoted to the bell-crank lever 2 by a pivot 19 and is illustrated by the drawings as composed of a back 20 and sides 21 and 22. This construction is illustrated as a simple construction which may be adopted for convenience in manufacturing.

An arm 23 is pivoted to the second bell-crank lever 18 and is provided with a part, which is illustrated as an anti-friction roller 24, adapted to bear against the end of the actuated member 6. A stop pin 25 is secured to the second bell-crank lever 18 and passes through an aperture 26 in the bell-crank lever 2 to limit the amplitude of movement of the second bell-crank lever 18 with respect to the bell-crank lever 2. A spring 27 is connected with the arm 23 and with the second bell-crank lever 18 and is a common actuating means for the arm 23 and the second bell-crank lever 18.

The operation of the mechanism will be readily understood. Referring to Figure 1 of the drawings, the arm 23 is pulled by the spring 27 against the inclined face 8 of the actuated member 6 and holds the actuated member 6 in a positive, predetermined position with the switch member 13 pressed against the contacts 14 and 15. If now the plunger 4 is moved to the right, the bell-crank lever 2 is turned about its pivot 3 stretching the spring 5 and the arm 23 is moved down, the antifriction roller 24 moving down the inclined face 8 and swinging the upper end of the arm 23 to the right and stretching the spring 27. While this motion continues the actuated member 6 is held in a positive, predetermined position with the switch member 13 pressed against the contacts 14 and 15 because the right hand end of the actuated member 6 is being pressed down and, as the arm 23 is doing this pressing, the stop pin 25 will be in its uppermost position in the aperture 26.

Figure 3:
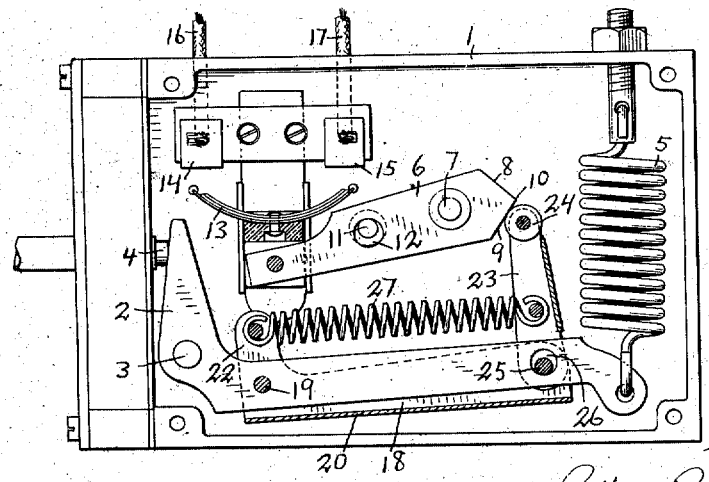
Figure 3 is an elevation of the same mechanism showing the parts in the relative positions which they occupy when the actuated member has been snapped to another positive, predetermined position.

The instant the antifriction roller 24 runs onto the point 10 of the actuated member 6, the actuated member 6 is in an impositive position or condition and, if the movement of the plunger 4 were very slow as is frequently the case, the mechanism would not be under control. The point 10 represents a position of inaction, uncertainty or dwell in the positive action of the mechanism, but my invention eliminates the inaction, uncertainty or dwell of the prior mechanism as will now be explained. When the antifriction roller 24 has rolled off the inclined face 8 onto the point 10, there is no resistance to the downward movement of the arm 23. The tension of the spring 27 can, therefore, swing the second bell-crank lever 18 on its pivot 19 and pull the arm 23 down. The extent of movement is limited by the stop pin 25 in the aperture 26. The action is instantaneous no matter how slow may be the movement of the plunger 4 and the bell-crank lever 2. As soon as the antifriction roller 24 passes below the point 10, the tension of the spring 27 pulls the arm 23 to the left and the antifriction roller 24 presses against the inclined face 9 of the actuated member 6 and swings it about its pivot 7 into another positive, predetermined position in which the switch member 13 is removed from the contacts 14 and 15, as clearly shown by Figure 3 of the drawings. When the spring 5 causes movement of the bell-crank lever 2 in the opposite direction, the mechanism will act in the reverse manner as will be readily understood.

The inclined faces 8 and 9 need not meet in a point as it is only necessary that the arm 23 can be moved independently of the bell-crank lever 2 when it has cleared an inclined face, but this specific construction has been chosen for illustration because it clearly exemplifies the invention and its advantages.

It will readily be seen that the inclined faces 8 and 9 and the roller 24 provide interengaging elements, one of which has inclined faces and the other one having an engaging part, whereby the spring 27 holds the interengaging elements in forcible contact, such forcible contact being equally as well applied on either side of the apex or point 10 between the two inclined faces 8 and 9.

It will further be seen that by providing a lost-motion connection in one of the interengaging elements that as a result thereof, one element will move relative to the other across the point 10 so that the elements will interengage by contacting forcibly either with the inclined face 8 or the inclined face 9. It is the lost-motion connection of one of the elements that enables the actuated member to be held positively in one of two positive, predetermined positions.

I claim as my invention:

1. The combination with a pivoted actuated member provided with oppositely inclined faces at one end, of a lever, means for moving the lever in opposite directions, an arm connected with said lever and provided with a part adapted to bear against the inclined faces at the end of the actuated member, a spring to press said arm against the actuated member, and means to move said arm independently with respect to said lever.

2. The combination with a pivoted actuated member provided with oppositely inclined faces, of a bell-crank lever, means to rock said lever in one direction, a spring to rock said lever in the opposite direction, a second bell-crank lever pivoted to the first mentioned bell-crank lever, an arm pivoted to the second bell-crank lever and having a part adapted to bear against the inclined faces on the actuated member, and a spring to actuate said arm and said second bell-crank lever.

3. The combination with a pivoted actuated member provided with oppositely inclined faces, of a lever, means to move said lever in one direction, a spring to move said lever in the opposite direction, a bell-crank lever pivoted to said lever and having a limited movement with respect thereto, an arm pivoted to said bell-crank lever and having a part adapted to bear against the inclined faces on the actuated member, and a spring connected with said arm and with said bell-crank lever to hold the arm in contact with an inclined face on the actuated member.

4. The combination with a pivoted actuated member provided with oppositely inclined faces at one end, of a lever, means for moving the lever in opposite directions, an arm connected with said lever and provided with a part adapted to bear against the inclined faces at the end of the actuated member, a spring for normally holding said arm and actuated member in contact, and means to move said arm independently with respect to said lever.

5. The combination with a pivoted actuated member provided with oppositely inclined faces at one end, of a lever, means for moving the lever in opposite directions, an arm connected with said lever and provided with a part adapted to bear against the inclined faces at the end of the actuated member, a spring for normally holding said arm and actuated member in contact and said lever having an aperture therein, said arm having a part passing loosely through said aperture to provide for limited movement of the arm independently of and relative to said lever.

6. The combination with a pivoted actuated member provided with oppositely inclined faces at one end, of a lever, means for moving the lever in opposite directions, an arm connected with said lever and provided with a part adapted to bear against the inclined faces at the end of the actuated member, a spring for normally holding said arm and actuated member in contact, and a lost-motion connection between said arm and lever.

7. The combination with a pivoted actuated member, of a lever, means for moving the lever in opposite directions, an actuating member connected with said lever, said actuated and actuating members being provided with interengaging elements, including oppositely inclined faces on one of said members and an arm on the other member having an engaging part to bear against said inclined faces, and a spring for normally effecting a forcible contact between said engaging part and the inclined faces, said arm being provided with a lost-motion connection permitting a slight independent movement thereof.

8. The combination with a pivoted actuated member, of a lever, means for moving the lever in opposite directions, an actuating member connected with said lever, said actuated and actuating members being provided with interengaging elements, including oppositely inclined faces on one of said members and an arm pivotally mounted on the other member having an anti-friction roller to bear against said inclined faces, and a spring for normally effecting a forcible contact between said engaging part and the inclined faces, said arm being provided with a lost-motion connection permitting a slight independent movement thereof.

9. The combination with a pivoted actuated member, of a lever, means for moving the lever in opposite directions, an actuating member connected with said lever, said actuated and actuating members being provided with interengaging elements, including oppositely inclined faces on one of said members and an arm pivotally mounted on the other member having an anti-friction roller to bear against said inclined faces; and a spring for normally effecting a forcible contact between said engaging part and the inclined faces, said arm being provided with a lost-motion connection, whereby said actuated member is held in one of two positive, predetermined positions until movement of said lever in either direction causes said roller to pass from one inclined face to the other, whereupon the tension of said spring will cause said actuated member to pass at once to its other positive predetermined position.

10. The combination with a pivoted actuated member, of a lever, means for moving the lever in opposite directions, an actuating member connected with said lever, said actuated member and actuating member being provided with interengaging elements, including oppositely inclined faces on one of said members and an arm connected with the other of said members provided with a part adapted to bear against said inclined faces, a spring to press said part against the inclined faces, whereby movement of said lever in either direction effects relative movement of said part and the inclined faces of said member, and means to move said arm and through said arm the actuated member, independently of the movement imparted by said lever.

11. The combination with a pivoted actuated member provided with oppositely inclined faces at one end, of a lever, means for moving the lever in opposite directions, an arm connected with said lever and provided with a part adapted to bear against the inclined faces at the end of the actuated member, a spring for normally holding said arm and actuated member in contact, and a lost-motion connection for permitting snap movement of said actuated member under the influence of said spring independently of the movement imparted thereto by the lever.

12. The combination with a pivoted actuated member provided with oppositely inclined faces at one end, of a lever, means for moving the lever in opposite directions, an arm connected with said lever and provided with a part adapted to bear against the inclined faces at the end of the actuated member, a spring to press said arm against the actuated member, said arm being provided with a slot-and-pin mounting whereby it may be moved independently with respect to said lever.

13. The combination with a pivotally mounted actuated member, of a lever, means for moving the lever in opposite directions, an actuating member mounted on said lever, said actuated and actuating members being provided with interengaging elements, including oppositely inclined faces on one of said members and an anti-friction roller to bear against said inclined faces, and a spring for normally effecting a forcible contact between said engaging part and the inclined faces, one of said members being provided with a lost-motion mounting whereby said actuated member is held in one of two positive, predetermined positions until movement of said lever in either direction causes said roller to pass from one inclined face to the other, whereupon the tension of said spring will cause said actuated member to pass at once to its other positive predetermined position.

Des Moines, Iowa, February 14, 1929.

GEORGE A. KNAAK.